Jan. 17, 1928.

H. S. PIERCE

BRAKE

Filed April 26. 1926

INVENTOR
HODGSON S. PIERCE
BY
ATTORNEY

Jan. 17, 1928. 1,656,607
H. S. PIERCE
BRAKE
Filed April 26, 1926 2 Sheets-Sheet 2
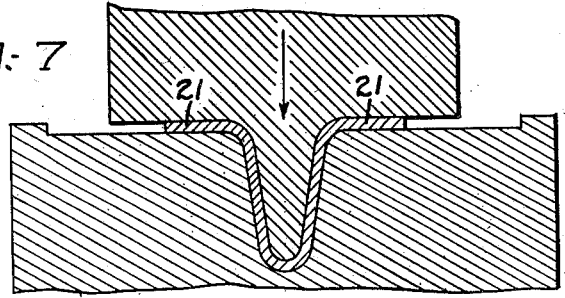
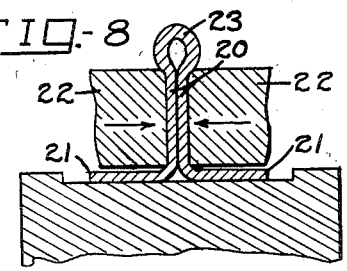
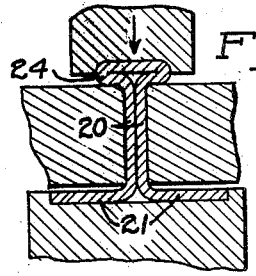
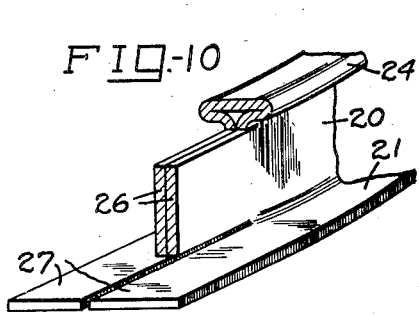
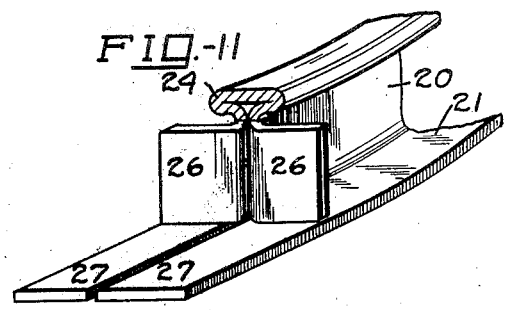
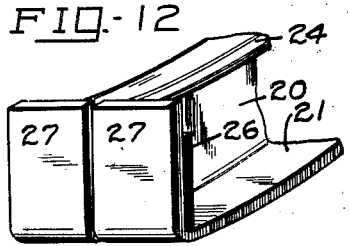
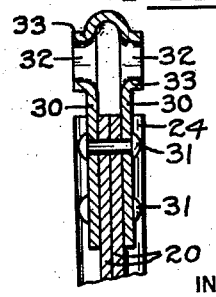
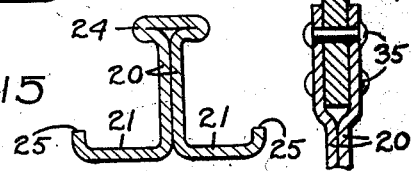
INVENTOR
HODGSON S. PIERCE
BY
P. N. Pomeroy
ATTORNEY Patented Jan. 17, 1928.

1,656,607

UNITED STATES PATENT OFFICE.

HODGSON S. PIERCE, OF DETROIT, MICHIGAN, ASSIGNOR TO THE STUDEBAKER CORPORATION, OF SOUTH BEND, INDIANA, A CORPORATION OF NEW JERSEY.

BRAKE.

Application filed April 26, 1926. Serial No. 104,696.

This invention relates to shoes for brakes, and particularly to shoes for brakes of the internal expanding type such as are commonly used in connection with motor vehicles, and the principal object is to provide such a shoe formed from sheet metal whereby it will be light in weight, strong in construction, and will be capable of being economically produced, particularly in quantities.

Another object is to provide a pressed metal brake shoe formed, for the most part, from a single piece of sheet metal to present a cylindrical brake lining supporting portion and a radial rib or flange portion.

Another object is to provide a pressed metal brake shoe formed to present a cylindrical brake lining attaching surface and a radial rib, the marginal edges of the cylindrical surface being inwardly turned into a plane radial thereto to impart added stiffness to the shoe.

Another object is to provide a pressed metal brake shoe formed to present a cylindrical brake lining attaching surface and a radial rib, the inner free edge of said rib being formed to present a flange transverse to the plane thereof to impart added strength thereto.

Another object is to provide a brake shoe the main portion of which is formed from a single piece of sheet metal to form a double thickness radial rib and a single thickness cylindrical brake lining attaching surface.

Another object is to provide a brake shoe, the main body portion of which is formed by pressing a single sheet of metal to present two sections each having an extending flange on each side of the center line thereof, and then bending said sections into back-to-back relationship.

Another object is to provide a brake shoe formed by bending a single sheet of metal to present a reversely bent rib portion and perpendicularly oppositely extending face portions.

Another object is to provide a brake shoe formed from a single sheet of metal by bending the sheet back on itself about its center line, and by bending a substantial portion of the free edges of said sheet oppositely to each other in a direction perpendicular to the reversely bent portion thereof.

A further object is to provide a brake shoe formed from a single sheet of metal to present a rib formed by said metal being reversely bent about its center line and a face formed by bending a substantial portion of the longitudinally extending free edges of said metal outwardly from said rib in opposite directions, the inner edge of said rib being bent to present a hollow reinforcing edge which is preferably flattened in a plane perpendicular to the rib.

The above being among the objects of the present invention, the same consists of certain features of construction and combination of parts to be hereinafter described with reference to the accompanying drawings, and then claimed, having the above and other objects in view.

In the accompanying drawings which illustrate a suitable embodiment of the present invention, and in which like numerals refer to like parts throughout the several different views, Figure 1 is a plan view of a brake shoe embodying the present invention.

Figure 7 is a transverse section through a die such as is preferably used in the second step of forming the present shoe.

Figure 8 is a transverse section through a die such as is preferably used in the third step of forming the present shoe.

Figure 9 is a transverse sectional view through a die such as is preferably used in the fourth step of forming the present shoe.

Figure 10 is a perspective view of the cam contact face end of the shoe showing the first step in forming it to receive the hardened cam contact face member.

Figure 11 is a perspective view corresponding to that in Figure 10, but showing the end of the shoe after the second step in forming it has been completed.

Figure 12 is a perspective view of the end of the shoe in a state of completion ready to receive the hardened cam contact face member.

Figure 13 is a sectional view of the pivoted end of the shoe taken on the line 13—13 of Figure 2.

Figure 14 is a sectional view of the modified form of pivoted end of the shoe shown in Figure 4, taken on the line 14—14 of Figure 4.

Figure 15 is a transverse sectional view through a modified sectional form of shoe.

Figure 1:
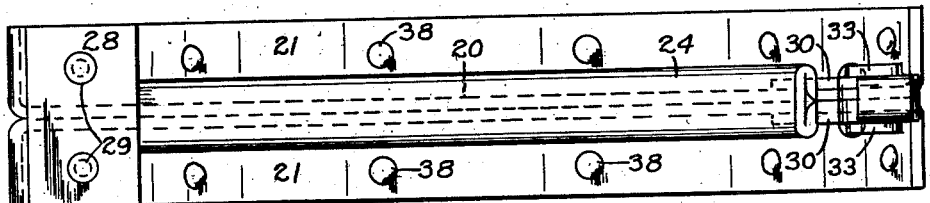

The brake shoe illustrated in the accompanying drawings is of that conventional type which is adapted to be anchored on a pivot pin at one end and engaged by an expanding cam at the other or free end, and provided with a cylindrical brake lining attaching surface and strengthening or stiffening rib. The present shoe is formed from a single sheet of metal to present a section in which the sheet is reversely bent along its center line to a point approximately midway between its center line and the edges parallel thereto, and then each side of the sheet is bent outwardly perpendicularly to the plane of the reversely bent portion and oppositely to each other, forming a central rib portion 20 and brake lining supporting faces or portions 21.

The portions 21 of the finished shoe are, of course, disposed in a cylindrical path and represent a portion of a cylindrical surface, the rib 20 being disposed radially thereto.

It may be desirable to further strengthen the shoe by increasing the stiffness of the rib, and in the present invention this is accomplished by forming the metal at the inner edge of the rib 20 to present a greater width than the body of the rib 20, either by forming that edge into a tubular shape, such as is shown in Figure 8 as having been formed in the operation of forming the transverse flanged inner edge illustrated, or by a transverse flanged portion such as shown in the drawings as being the preferable construction.

The shoe thus described may be formed in several different ways or steps. For instance, it may be formed in a straight line to the correct section and then be bent to the proper curvature, or it may be formed to the proper curvature from the first operation and carried through subsequent forming operations in that shape. The first method, however, may be found impractical where the depth of the rib 20 is too great to allow successful drawing of the metal in the operation of bending the shoe to the proper curvature, in which case the second method may be used satisfactorily.

Figures 2, 3, 4, 5:
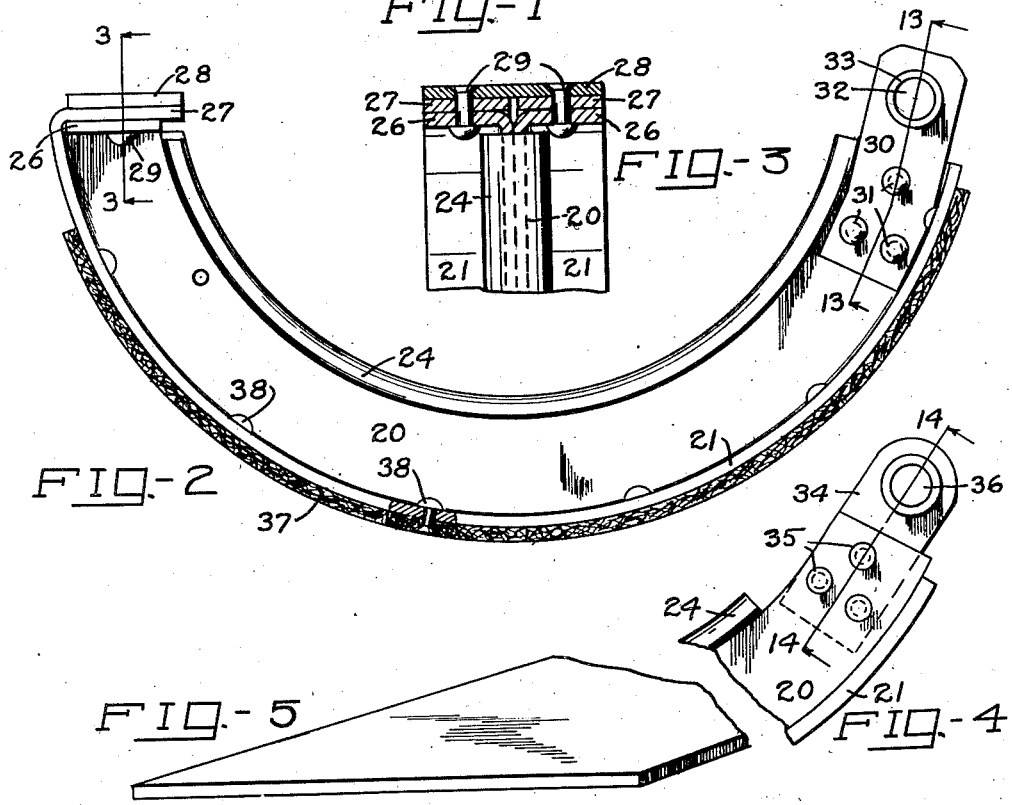
Figure 2 is a side view of the shoe shown in Figure 1.
Figure 3 is a sectional view taken on the line 3—3 of Figure 2.
Figure 4 is a side view of a modified pivoted end construction for the shoe shown in Figure 2.
Figure 5 is a fragmentary perspective view of a sheet of metal such as may be used to form the shoes shown in the previous views.
Figure 6:
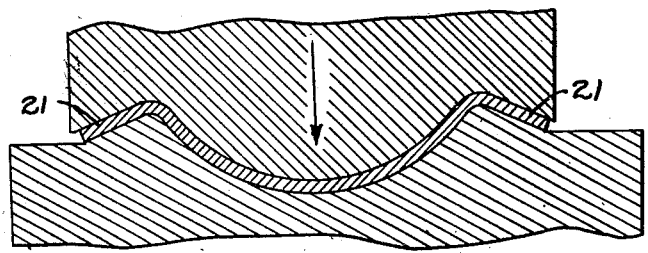
Figure 6 is a transverse section through a die such as is preferably used in the first step of forming the present shoe.

One method of forming the shoe is shown in Figures 5 to 9 inclusive and in this method the dies may be formed straight or cylindrical to form the shoe in either of the ways described above. The first operation consists in taking a flat piece of metal, as illustrated in Figure 5 and placing it in a die of the sectional shape shown in Figure 6, which forms the metal to the shape shown in that figure. This first operation, as will be noted, strikes off and defines the edge portions 21 which are to become the face portions 21, and the metal therebetween, which is to form the web or rib 20, is formed in a rather wide curve. This piece of sheet metal is then placed in a die of the sectional shape shown in Figure 7 and the die halves brought together. This operation deepens the center portion of the sheet and forms it into a relatively deep trough having a curved bottom, thereby drawing the edge portions 21 into closer relationship and into the same plane. The piece of metal is then turned over and placed in a die of the construction shown in Figure 8, in which two die parts 22, of less depth than the center or trough-shaped part of the piece of metal, and which are disposed in contacting or nearly contacting relationship with the edge portion 21, are brought together, thereby bringing the sides of the trough together into contacting relation to form the web or rib 20. Inasmuch as the die parts 22 do not extend to the bottom of the trough, the sides of the extreme bottom thereof are not brought into contacting relationship, but instead are formed to present a tubular section as shown and indicated as 23. If desired, this section may be used for the completed shoe, the tubular portion thereof forming a substantial stiffening means for the rib 20. It is also to be noted, that should the strength of the shoe be deemed sufficient without added stiffening means for the rib 20, the die parts 22 may be made of greater depth than the trough described in connection with Figure 7, and thus bring the sides thereof into contacting relationship over the entire depth in the operation described in connection with Figure 8. If, on the other hand, greater transverse strength is desired in the rib 20 than is provided by the tubular portion 23 shown in Figure 8, the same may be flattened in a plane transverse to the rib by an operation such as is indicated in Figure 9, which changes the tubular portion 23, shown in Figure 8 to a transverse flange 24 as shown in Figure 9 and in other views as the preferred construction. The shoe may be further strengthened by turning up the free edges of the face portions 21 to provide marginal flanges 25 perpendicular thereto as indicated in Figure 15. The two contacting halves of the rib 20 are also preferably welded or otherwise secured together to prevent possibility of spreading and consequent deformation of the shoe in service.

In Figures 10 to 12 inclusive is shown a preferable method of forming the end of the shoe for receiving and supporting the hardened cam contact face member. The first operation is to form the end of the shoe as shown in Figure 10, which may be done by suitably shaping the blank before the forming operations, or by cutting away parts thereof after the same. The effect, in either case, is to remove a portion of the rib flange 24 and a lesser portion of the rib 20 and severing the rib 20 from the face portions 21 back to a point in line with the end of the rib flange 24. This operation, as indicated in Figure 10, leaves two ends 26 projecting out from the rib portion 20 and in a plane parallel thereto, and two ends 27 projecting out from the ends of the face portions 21. The next operation is to bend the rib ends 26 outwardly and away from each other into a plane perpendicular to the plane of the rib 20, as indicated in Figure 11, and the succeeding operation comprises bending the ends 27 upwardly, perpendicular to the face 21 at the point of bending, into contacting relation with the ends 26, and preferably welding or otherwise securing them to such ends. This results in a very sturdy and unyielding support for the hardened cam contact face member 28 which may be secured thereto by rivets such as 29 as indicated in Figures 1, 2 and 3, and which takes the wear of the cam (not shown) which operates to move the shoe outwardly into contact with its drum (not shown).

As previously described, the opposite end of the shoe is adapted to be supported on a pin so as to be pivoted thereabout. In the drawings a preferred form of construction is indicated in Figures 1, 2 and 13. In these figures the pivoted end is shown as being constructed from a strip of sheet metal which is bent back on itself about a line midway between its ends to form two spaced parallel arms 30, the distance between which is equal to the thickness of the double thickness rib 20 which is inserted therebetween, with the arms 30 positioned between the rib flange 24 and face portions 21, and which is secured thereto by rivets such as 31 with a substantial length of the connected portion of the arms projecting out past the end thereof. Openings 32 are provided in the projecting portions of the arms 30 for receiving the pivoting pin (not shown). The openings 32 may be simply drilled in the arms 30, or may be formed as particularly well shown in Figure 13, by punching the holes in the metal to form collars 33 thereabout in the punching operation, before the arms are bent into parallel relation, and thereafter bending the arms into their proper relative positions with the openings 32 in alignment and the collars 33 projecting outwardly in opposite directions. This, it will be apparent, furnishes a relatively greater, and more widely separated bearing surface for the pin upon which the shoe is to pivot than by drilling, but should a still greater bearing surface be desired, a bushing (not shown) may be inserted in the openings 32.

A modified end construction is shown in Figures 4 and 14, in which construction the two parts of the rib 20 are separated at and adjacent the pivoted end of the shoe, and a member 34 is inserted therebetween and secured thereto by rivets such as 35, the projecting end of the member 34 being provided with a bossed opening 36 serving the same purpose as the openings 32 described in connection with the preferred construction.

The shoe with the ends constructed as above described, is ready to receive the brake lining 37, which is applied to the outer face of the face portions 21 and is secured thereto by rivets 38 as indicated in Figures 1 and 2, thus completing the shoe.

Formal changes may be made in the specific embodiment of the invention described without departing from the spirit and substance of the broad invention, the scope of which is commensurate with the appended claims.

What I claim is:—

1. A brake shoe, the main body portion of which is formed from a single sheet of metal to present a single thickness brake lining attaching surface and a double thickness radial rib, the two thicknesses of said rib being joined at their inner edge and being deformed at their point of junction to present a transverse stiffening means.

2. A brake shoe, the main body portion of which is formed from a single sheet of metal to present a generally cylindrically shaped single thickness brake lining attaching surface and a radial rib of double thickness, the free edge of said rib being enlarged transversely to the plane thereof to impart strength to said rib.

3. A brake shoe, the main body portion of which is formed from a single sheet of metal to present a generally cylindrically shaped brake lining attaching surface of a single thickness and a radial rib, of double thickness, the inner edge of said rib being formed to present a stiffening flange perpendicular to said rib.

4. A brake shoe the main body portion of which is formed from a single sheet of metal to present a generally cylindrically shaped brake lining attaching surface and a radial rib, said rib formed of two thicknesses of metal joined at the inner edge thereof, the metal at said inner edge being spread to impart lateral stiffness thereto.

5. A brake shoe, the main body portion of which is formed to present a generally cylindrically shaped brake lining attaching surface and a radial rib, said rib comprising a double thickness of metal joined at its inner edge, said inner edge being spread and flattened to present a flange transverse to the body of said rib.

6. A pressed metal brake shoe comprising a generally cylindrical attaching surface and a central radial rib, the marginal side edges of said attaching surface terminating in flanges perpendicular thereto.

7. A brake shoe, the main body portion of which is formed from a single sheet of metal to present a generally cylindrically shaped brake lining attaching surface and a radial rib, the margins of said brake lining attaching surface being inwardly turned to form stiffening means therefor.

8. A brake shoe, the main body portion of which is formed from a single sheet of metal to present a generally cylindrically shaped brake lining attaching surface and a radial rib, the free side edges of said attaching surface being bent inwardly perpendicularly to said attaching surface to form marginal strengthening flanges.

9. A brake shoe the main body portion of which is formed by forming a single sheet of metal to present two L-shaped sections each side of the centerline thereof, then bending said sections into back-to-back relationship, and a transverse reinforcing member connecting said sections at their inner ends.

10. A brake shoe the main body portion of which is formed from a single sheet of metal by bending said sheet back on itself about its centerline, bending a substantial portion of the free edges of said sheet oppositely to each other in a plane perpendicular to said main body portion, and bending the outer portions of said free edges into a plane parallel with said main body portion.

11. A brake shoe the main body portion of which is formed from a single sheet of metal to present a rib formed by said metal being reversely bent about its centerline, and a face formed by bending a substantial portion of the longitudinally extending free edges of said metal outwardly from said rib in opposite directions, the free edge of said rib being bent to present a strengthening flange perpendicular thereto.

12. A brake shoe of sheet metal having between its edges a stiffening web including two flanges integrally connected at the edge opposite the friction face of the shoe.

13. A brake shoe of sheet metal having a cylindrical outer friction face and having between its edges a stiffening web extending inwardly and including two flanges integrally connected at their inner edges.

14. A brake shoe of pressed metal having a stiffening web including two flanges integrally connected along the edge opposite the friction face.

Signed by me at Detroit, Michigan, U. S. A., this 21st day of April, 1926.

HODGSON S. PIERCE.